US011641500B2

(12) United States Patent
Chandra

(10) Patent No.: US 11,641,500 B2
(45) Date of Patent: May 2, 2023

(54) METHOD AND SYSTEM FOR CUSTOMIZED CONTENT

(71) Applicant: EDITORJI TECHNOLOGIES PRIVATE LIMITED, New Delhi (IN)

(72) Inventor: Vikramaditya Chandra, Delhi (IN)

(73) Assignee: EDITORJ1 TECHNOLOGIES PRIVATE LIMITED, New Delhi (IN)

( * ) Notice: Subject to any disclaimer, the term of this patent is extended or adjusted under 35 U.S.C. 154(b) by 0 days.

(21) Appl. No.: 16/961,299

(22) PCT Filed: Jan. 10, 2019

(86) PCT No.: PCT/IN2019/050021
§ 371 (c)(1),
(2) Date: Jul. 10, 2020

(87) PCT Pub. No.: WO2019/138426
PCT Pub. Date: Jul. 18, 2019

(65) Prior Publication Data
US 2021/0084350 A1    Mar. 18, 2021

(30) Foreign Application Priority Data
Jan. 11, 2018  (IN) .............................. 201811001309

(51) Int. Cl.
*H04N 7/16*      (2011.01)
*H04N 21/258*    (2011.01)
*H04N 21/262*    (2011.01)

(52) U.S. Cl.
CPC . *H04N 21/25891* (2013.01); *H04N 21/26258* (2013.01)

(58) Field of Classification Search
CPC .................. H04N 21/25891; H04N 21/26258
See application file for complete search history.

(56) References Cited

U.S. PATENT DOCUMENTS

| 7,321,923 B1 * | 1/2008 | Rosenberg ........... G11B 27/034 |
| | | 709/217 |
| 7,730,420 B1 | 6/2010 | Miller et al. |
| 8,275,880 B2 | 9/2012 | Allard et al. |

(Continued)

OTHER PUBLICATIONS

Andrew O'Baoill, Broadcasting in an on-demand world creating community radio in the ara of podcasting and webcasting; 2009; ProQuest Dissertations Publishing; Whole document (Year: 2009).*

(Continued)

*Primary Examiner* — Annan Q Shang
(74) *Attorney, Agent, or Firm* — Dilworth IP, LLC

(57) ABSTRACT

Aspects of the invention are directed towards systems and methods for providing the user with customized video content from a platform. Embodiments of the invention describes a user interface on the user terminal for receiving user preferences from the user. A number of buckets for the video content to be consumed by the user based on the user preferences are disclosed. The video content to be filled in each of the buckets is determined based on a real time criteria. The buckets are which are filled with the video content are assembled and a predetermined video content is interspersed between each of the bucket to form the customized video content.

35 Claims, 3 Drawing Sheets

(56) References Cited

U.S. PATENT DOCUMENTS

| | | | |
|---|---|---|---|
| 8,615,778 B1* | 12/2013 | Evans | H04N 21/4532 725/46 |
| 9,557,896 B1 | 1/2017 | Toff et al. | |
| 10,271,079 B1* | 4/2019 | Woschank | H04N 21/4788 |
| 10,555,023 B1* | 2/2020 | McCarthy | H04N 21/8549 |
| 2005/0060641 A1* | 3/2005 | Sezan | H04L 12/2805 715/202 |
| 2006/0047678 A1* | 3/2006 | Miyazaki | H04N 21/4667 |
| 2006/0265421 A1 | 11/2006 | Ranasinghe et al. | |
| 2007/0204302 A1* | 8/2007 | Calzone | H04N 21/4755 725/46 |
| 2008/0148152 A1 | 6/2008 | Blinnikka et al. | |
| 2008/0162570 A1 | 7/2008 | Kindig et al. | |
| 2009/0165051 A1* | 6/2009 | Armaly | H04N 21/4316 725/40 |
| 2010/0017455 A1* | 1/2010 | Svendsen | H04W 4/029 709/202 |
| 2010/0205166 A1* | 8/2010 | Boulter | G06F 3/0482 707/705 |
| 2010/0251295 A1* | 9/2010 | Amento | H04N 21/6587 725/38 |
| 2011/0129201 A1 | 6/2011 | McLean | |
| 2012/0060195 A1 | 3/2012 | Fishman et al. | |
| 2013/0007787 A1* | 1/2013 | John | H04N 21/4622 725/10 |
| 2013/0255336 A1* | 10/2013 | Desai | B62H 5/003 70/431 |
| 2013/0287212 A1* | 10/2013 | Marko | H04H 20/74 381/2 |
| 2014/0037264 A1* | 2/2014 | Jackson | H04N 21/44008 386/230 |
| 2014/0074846 A1 | 3/2014 | Moss et al. | |
| 2014/0282656 A1* | 9/2014 | Belyaev | H04N 21/251 725/14 |
| 2014/0328570 A1* | 11/2014 | Cheng | H04N 21/44008 386/241 |
| 2015/0020119 A1* | 1/2015 | Kim | H04N 21/4312 725/59 |
| 2015/0365725 A1* | 12/2015 | Belyaev | H04N 21/8133 725/46 |
| 2016/0301965 A1* | 10/2016 | Gudjonsson | H04N 21/26283 |
| 2017/0064400 A1* | 3/2017 | Riegel | H04N 21/2743 |
| 2017/0188070 A1* | 6/2017 | Abed | H04N 21/4348 |
| 2017/0322981 A1 | 11/2017 | Zhang et al. | |
| 2018/0014052 A1 | 1/2018 | Venkatraman et al. | |
| 2018/0199110 A1* | 7/2018 | Cormican | H04N 21/816 |
| 2018/0255366 A1* | 9/2018 | Lockett | H04N 21/42204 |
| 2019/0069013 A1* | 2/2019 | Abed | H04N 21/2353 |
| 2019/0098352 A1* | 3/2019 | Jung | H04N 21/251 |

OTHER PUBLICATIONS

Notification of Transmittal of The International Search Report and The Written Opinion in PCT/IN2019/050021, dated Apr. 8, 2019; 1 page.

International Search Report in PCT/IN2019/050021, dated Apr. 8, 2019, 3 pages.

Written Opinion of the International Searching Authority in PCT/IN2019/050021, dated Apr. 8, 2019, 4 pages.

* cited by examiner

METHOD AND SYSTEM FOR CUSTOMIZED CONTENT

TECHNICAL FIELD OF INVENTION

The present invention relates to methods and systems for creating customized video content and playlists. More particularly the invention relates to a method and system for creating customized newscasts.

BACKGROUND OF THE INVENTION

Currently, broadcast video news on television channels is largely a passive consumption based activity. The video news clips play one after another in a linear stream and the users passively consume the news in the manner in which it is being broadcast by the TV news channel. This is a linear model of consumption in which users cannot exercise their choice to view a particular news story or to get news reports customized to their interest.

Video news on digital platforms enable the exercise of choice. With the growth of mobile devices, consumers can access news reports as per their interest. However, there are several problems associated with the methods and systems in the existing art providing video news on digital platforms.

The current system of providing video news on digital platforms is not intelligent and also requires considerable effort from the consumer to search for and select video clips to watch. Attempts to provide a user with personalized newscast are purely based on the user preferences from the predetermined news sources recorded therein. Such sources may or may not be authentic and there is no method or system that exists in the current art that can sift the authentic, curated news from fake or dubious news. Additionally, such digital platforms (news providers) do not use parameters or a combination thereof, such as editorial importance of a news report, user preferences, location of the user, time elapsed since a story emerged, whether the viewer has already seen the news story etc. to customize a newscast intelligently.

Another problem that exists in the prior art is of a suitable user interface for accessing news reports. Many current user interfaces require the selection of individual video clips by clicking on them. This may be suitable for a movie or long form content, because after selecting the clip, the user can sit back for enough time to enjoy the content. However, such an interface is not suitable for video formats where the length of an individual clip is not very long. News clips, for example, are a few seconds or a minute or two. A viewer has to keep clicking on news clips every few seconds to get the latest reports. This is cumbersome, and is one of the main reasons why video news on digital platforms is yet to replace TV news. Finally, users are able to search for specific video news stories only if they know they exist. But news, by definition, is something new that is happening and hence, viewers may not be aware of stories that may be of relevance to them.

In addition, as hundreds of millions of new users get access to the internet and to mobile devices, they need to get instant and easy access to credible information in a manner that is simple to understand. Ideally, they should not have to type in complicated search queries, especially in parts of the world where literacy is a problem to obtain the desired news content. This requires a new type of interface to come to the fore.

Finally, the existing art does not enable a platform that can prove to be a viable bridge between content creators and content users in a manner that combines ease of use with personalization and credibility.

In the existing literature, the U.S. Pat. No. 9,557,896 discloses an interstitial creator that identifies a playlist of media items. The playlist comprises pointers to the media items. When the interstitial creator receives a request to insert an interstitial at a location in the playlist, in response to the request, the interstitial creator provides an interstitial creation interface and receives, through the interstitial creation interface, interstitial configuration parameters. The interstitial creator creates the interstitial based on the received interstitial configuration parameters and inserts a pointer to the interstitial into the playlist at the location.

Another literature in the state of art, US Patent Publication 20180014052A1 discloses a method for a real time, dynamic, adaptive and non-sequential assembling of one or more mapped fragments of one or more tagged videos. The method includes the steps of receiving a set of preference data associated with a user from pre-defined selection criteria and a set of user authentication data. The pre-defined selection criteria are based on dates, time zones, days, seasons, physical locations, occasions, identified names, video genres and the like. The pre-defined selection criteria are associated with a digitally processed repository of videos.

There is therefore, a need in the art for a method and system that provides video content from authentic sources and such content, in the form of a playlist comprising video clips but not limited thereto, that can be streamed one after another in a logical manner customized to users' needs using predetermined parameters. Further, there is a need in the art to use tools like applied artificial intelligence, machine learning, and deep learning to help create customized content, for example in the form of a customized playlist but not limited thereto. Further, there is a need in the art to provide a common platform to align content creators with target consumers. Thus, there is a need to provide one touch access to video news in a format that is easy to understand for the millions of people who are unfamiliar with digital technologies.

The present invention overcomes the above mentioned problems associated with conventional digital platforms offering personalized content by providing a method and system of uploading video content from authentic sources and such content, in the form of a playlist comprising video clips but not limited thereto, can be streamed one after another in a logical manner customized to users' needs using predetermined parameters. As an example, the video content could be news content. The system hence enables linear streaming of nonlinear news stories customized to users' needs using predetermined parameters. Further, the invention provides a system in the form of a news platform with a simple interface that is easy to navigate, including the ability to swipe from one story to another. The existing art relies only on user preferences and would therefore lead to echo chambers by giving people only what they want, whereas the present invention provides broad based news in a logical manner. Further, the present invention enables use of artificial intelligence tools like machine learning and deep learning to help create customized video content, for example in the form of a customized playlist of news stories. Additionally, the invention provides a system to align content creators with target users.

OBJECTIVES OF THE INVENTION

A basic object of the present invention is to overcome the disadvantages and drawbacks of the known art.

It is an object of the present invention to provide a method and system of producing, curating and permitting the uploading of video content from authentic sources that can be streamed one after another in a logical manner customized to users' needs using predetermined parameters.

It is an object of the present invention to provide a method and system of producing news/video content, in the form of a playlist comprising video clips but not limited thereto, that enables linear streaming of nonlinear news stories customized to users' needs using predetermined parameters.

It is an object of the present invention to provide a method and system of providing content in the form of an intelligent playlist, where the user is able to view all the video clips that are relevant, without having to take any further steps.

It is an object of the present invention to provide a method and system of providing content in the form of an intelligent playlist, where the user is able to hear all the audio clips that are relevant, without having to take any further steps.

It is an object of the present invention to provide a method and system of providing content in the form of an intelligent playlist wherein the resultant playlist can be downloaded to devices at predetermined times.

It is an object of the present invention to provide a method and system of providing news content in the form of an editable playlist including allowing users to create a new playlist.

It is an object of the present invention to provide a method and system wherein the editable playlist can be shared.

It is an object of the present invention to provide a method and system of providing news content to targeted consumers from authentic sources to avoid the problem of fake news.

It is another object of the present invention to provide a method and system of offering a news platform with a simple interface that is easy to navigate.

Another object of the present invention is to provide a method and system for providing an on-demand newscast, available at the tap of a single button or via a single command.

It is an objective of the invention to allow users to swipe from one story to another, if they want to move on.

It is also an objective of the invention to allow users to create new playlists by simply tapping on video news clips, and then adding their opinion to those playlists.

Another object of the present invention is to provide a system and method of providing the user flexibility to customize and play the newscast based on user interests and other predetermined parameters.

Yet another object of the invention is to enable subsequent enhancement based on data analytics, machine learning and other artificial intelligence methods from data patterns of news consumption and other parameters.

SUMMARY OF THE INVENTION

In various embodiments, the present invention discloses a method of providing a customized content from a platform to a user. A user interface on the user terminal receives user preferences including time duration related to video content for the user. The method creates a number of buckets for the content to be consumed by the user based on the user preferences. The content to be filled in each of the buckets is determined. The method further provides filling the determined content in each of the bucket by a real time criteria which is based on the user preferences among other factors. The buckets which are filled with the content are assembled and a predetermined content is interspersed between each of the bucket to form the customized video content. The customized video content is transmitted to the user terminal for user consumption. The video content also includes associated audio content accessible through various platforms.

In another embodiment of the invention, the user preferences include genre for the content to be filled in buckets, wherein the genre include content belonging to one or more of international, national, local, location based, sports, technology, business, and entertainment.

In yet another embodiment of the invention, each of the bucket is created based on the duration of the content to be filled in each bucket, where each of the bucket designates a storage space for the user providing the user preferences.

In another embodiment of the invention, the content in each of the bucket may include a long package if the time duration of the bucket exceeds a predetermined time. In one embodiment of the invention, the long package is selected based on editorial priority value. In another embodiment of the the invention, the selection of the long package is based on a Story Decision Value (SDV) among the long packages available for each bucket. The remaining duration of the bucket after the filling of the long package is determined based on a real time criteria. The real time criteria to fill the video content in each bucket is based on the Story Decision Value (SDV).

In still another embodiment of the invention, the calculation of the SDV is based on Editorial Priority Index, Time Elapsed Index, Video Content already viewed, Local Index parameters etc. It is to be noted that the parameters to calculate the SDV similar to the ones recited herein are within the scope of the invention.

In various embodiments of the invention, the user preferences are input using a graphic slider and/or bar and/or numeric digits and/or by simply using tapping gestures on the desired user preferences on the user terminal.

In an embodiment of the invention, the video content for user consumption is in the form of a playlist. The playlist can be edited and the content can be re-arranged and deleted by the user. In another embodiment of the invention, a new story or any content can be added by the user in the playlist. In yet another embodiment, the edited playlist can be uploaded on the platform and the edited playlist can act as the content for other users.

In another embodiment of the invention, users can create their own playlists at the tap of a button. They can then tap the button to open the camera on the device and record their own opinion. This opinion is added to the playlist and can be shared with other users on the platform.

In an exemplary embodiment of the invention, the content includes at least a content which is always shown to the user and the content thus shown is provided irrespective of the user preferences.

In various embodiments of the invention, a user terminal is described for receiving customized video content from the network. A user interface receives user preferences comprising time duration to watch the customized video content. The user terminal includes a transmitting unit to transmit the user request to the network using a single tap of a button. A receiving unit receives the customized video content from the network. The network is configured to create a number of buckets for the video content to be consumed by the user based on the user preferences and determines the video content to be filled in each of the buckets. Further, the determined video content is filled in each of the buckets by a real time criteria based on the user preferences. The buckets with filled video content are assembled and a predetermined video content between each of the bucket to form the customized video content is interspersed. The user terminal includes a display unit to display the customized video content on the user interface.

In another embodiment of the invention, the user preferences are input using a graphic slider, bar, numeric digits and/or by using tapping gestures on the user terminal.

In another embodiment of the invention, the customized video content for user consumption is in the form of a playlist. The playlist can be edited and the video content in the form of video clips therein can be re-arranged and deleted by the user. In another embodiment of the invention, a new story or video content can be added by the user in the playlist. In an exemplary embodiment, the user can upload the edited playlist on the network and the edited playlist on the network can act as video content for other users. The user can create his/her own new playlist including adding opinions. The opinions shared/uploaded by the user are not anonymous and are attributable to the user.

In still another embodiment of the invention, the customized video content is received from the network on a single tap of button as input from the user. In other words, once the user opens the application on the user device, the user can simply tap on the button displayed on the display screen to retrieve the customized video content. In an alternative embodiment of the invention, the input can be a voice command or a video command. On the receipt of the command, such as the voice command, say "Play me my newscast", the application retrieves the customized video content from the platform in accordance with different embodiments of the invention.

In yet another embodiment of the invention, a system to provide customized video content for consumption by a user using a user terminal is disclosed. The system comprises a receiving unit to receive user preferences from a user terminal, wherein the user preferences comprise time duration related to video content desired by the user. An analyzer unit is used for analyzing the user preferences and to determine the video content to be retrieved from the system is disclosed. The system includes bucket creation unit to create a number of buckets for the video content to be consumed by the user based on the user preferences and a determination unit to the video content to be filled in each of the buckets. An assembling unit for assembling the buckets with filled video content and interspersing a predetermined video content between each of the bucket to form the customized video content is disclosed. A transmitting unit transmits the customized video content to the user terminal for user consumption.

In an embodiment of the invention, a computer readable medium comprising one or more processors and a memory coupled to the one or more processors is disclosed. The memory is used for storing instructions which on execution by the one or more processors, cause the one or more processors to receive user preferences from a user terminal. The user preferences comprise time duration related to video content. The computer readable medium is configured to create a number of buckets for the video content to be consumed by the user based on the user preferences and to determine the video content to be filled in each of the buckets. The computer readable medium is further configured to fill the determined video content in each of the bucket by a real time criteria which is based on the user preferences and assemble the buckets with filled video content and interspersing a predetermined video content between each of the bucket to form the customized video content. The customized video content is transmitted to the user terminal for user consumption.

In yet another embodiment of the invention, a user terminal is configured to receiving customized content from the network. The user terminal comprises a user interface to receive user preferences from a user comprising time duration to hear the customized content. The terminal includes a transmitting unit to transmit the user preferences to the network using a single tap of a button. A receiving unit receives the customized content from the network. The network is configured to create and fill buckets with the content, preferably an audio content customized based on user's preferences. The buckets are assembled and predetermined content is interspersed between each of the bucket to form the customized content. The customized content can be played by an output unit of the user terminal.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
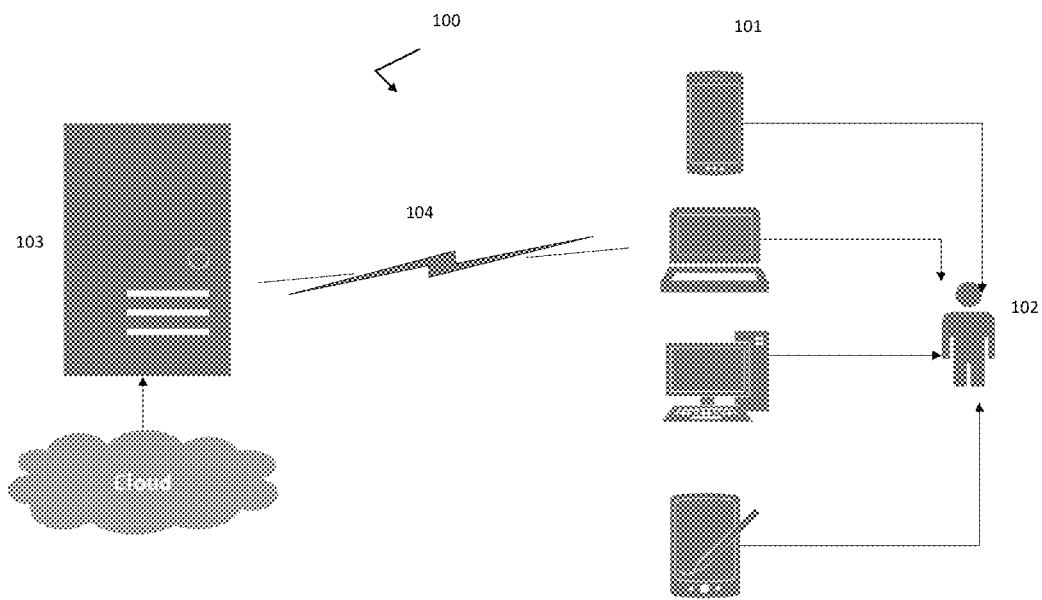
FIG. 1 is an exemplary network include user terminal working along with the server/cloud according to an exemplary embodiment of the invention.

Reference is made throughout the specification to "various embodiments," "some embodiments," "one embodiment" "another embodiment" or "an embodiment", or the like, meaning thereby that a particular feature, structure, or characteristic described in connection with the embodiment is included in at least one embodiment. Thus, appearances of the phrases referred above in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

Further reference to any content has been made throughout the specification and words and phrases such as "news", "news content", "video content", "news story", "story", "video clips", "news clips", "audio clips" or the like have been interchangeably used and means the content available on the platform and utilized by the platform for delivering to the users. Further, the content can also be in the form of audio content, textual content and other types of content formats known in the art. Moreover, the words and phrases like "servers", "cloud", "platform", "one or more servers" or the like have been interchangeably used which means the component of system where the content and intelligence of the invention are stored and executed.

Moreover, although the following description contains many specific situations or the purposes of illustration, a person skilled in the art will appreciate that many variations and/or alterations to said details are within the scope of the present invention described herein. Similarly, although many of the features of the present invention are described in terms of each other, or in conjunction with each other, one skilled in the art will appreciate that many of these features can be provided independently of other features. Therefore, the description of the present invention is set forth without any loss of generality to, and without imposing limitations upon, the present invention.

Described herein is the technology with systems, methods, and devices for providing customized content in the form of newscast to a user terminal. The invention discloses a method and system of providing content from authentic sources and such content, in the form of a playlist comprising video clips but not limited thereto, which can be streamed one after another in a logical manner customized to users' needs using predetermined parameters. As an example the video content is news content. As an example the system is a news platform. The news platform (referred to as platform henceforth) hence enables linear streaming of nonlinear news stories customized to users' needs using predetermined parameters.

The platform enables the authentic news providers to upload content to a cloud associated with the platform. The platform is used to analyze and transform the content uploaded on the cloud into personalized playlists by intelligence provided in the system. The playlists can then be accessed on demand by each user. The playlist can also be downloaded as per user selection.

In a preferred embodiment of the invention, a platform is described which enables uploading of content (news/video clips) on the cloud by authentic news providers including news channels, opinion makers, self-created stories by employees of the platform, news editors, authentic content providers etc. It is to be noted that the aim of uploading the content on the cloud or one or more servers is to upload the authentic content from authentic sources. The content collected on the cloud is classified and meta-tagged on the basis of a number of parameters including a) geography, i.e. whether an item is local, national, international etc.; b) character i.e. whether an item pertains to politics, entertainment, sports, technology etc.; c) popularity i.e. whether an item is trending news; but not limited to these parameters. The content uploaded is tagged according to the city or region it pertains to, and there is a time stamp depending on when the content entered the platform. Additionally, an Editorial Priority Value (EPV) is assigned to the uploaded content depending on subjective evaluation by human editors. The EPV can vary as additional information comes in. These meta-tags forming a data field are used by the platform to create the personalized newscasts.

According to the preferred embodiment of the invention, users can select the duration of the newscast they want to watch, and choose to view it with a single tap. Users can input a duration for which the user wants to view the newscast from the platform. The inputs can be a tap on a number of options provided to the user. For example, user can provide, but not limited to, options of 1 minute, 5 minutes, or 10 minutes for viewing the newscast. Each newscast comprises a playlist comprising video or news clips belonging to different categories. The duration of different categories of news clips based on geography, character, popularity etc. can be selected by various graphic input options known in the art. For example, the user can select the duration of news for each of the different categories by moving a slider. In one embodiment of the invention, the users can for example set preferences between categories by tapping once, twice or thrice on the relevant tabs.

In another embodiment of the invention, the platform includes an inventive intelligence inside the system to create and provide a logical playlist based on user's preferences and several other factors. The platform receives user preferences, creates a storage space corresponding to each user preference and calculates the size of storage space instantly depending on the duration selected by the user. For ease of reference, storage space is referred to as "bucket" throughout this disclosure. Several buckets together comprise a newscast. Newscasts can be presented in different forms and as an example, but not limited to, is presented in the form of a playlist to the user. In an embodiment of the invention, bucket is the storage space associated with a category of a user's preference. In addition to buckets created according to user preferences, newscast comprises of at least one bucket comprising "Top Stories", which is always shown to the user, irrespective of any other platform parameters or preferences. "Top Stories" are defined as stories selected by human editors and are necessarily provided in the newscast for the user. This is to ensure that certain key news stories as curated by human editors are shown to the user without being dependent on user preferences or artificial intelligence. The other buckets are created by using additional pre-set parameters. The size of each "bucket" depends on a number of factors including, but not limited to, the duration of each news clip belonging to a desired category, the duration of the newscast selected by a user, the duration of news clips comprising "Top Stories" etc. The duration of the newscast depends on the size of buckets and may be selected to be for example, but not limited to, 1 minute, 5 minutes, or 10 minutes.

The newscast in the form of a playlist, but not limited thereto, created by the platform is composed of buckets and is played out automatically one after another. The playlist may or may not be interspersed with anchor links. That is, the two buckets can be connected by anchor links for presenting the content. It is noted that the anchor link is a content which is provided between the buckets. As an example, anchor links pertain to an anchor seen between the content of the buckets sharing relevant information. The information on the anchor links can be the presentation of the content on the next bucket or any other information relevant to the user. In one embodiment of the invention, users have an option to "switch off" or remove the anchor links from the newscast. In yet another embodiment of the invention, users can manually add their own opinions as anchor links to the newscast. In one embodiment of the invention, the anchor link can be a textual display of the information relevant to the user.

In one embodiment of the invention, user is provided with an ability to skip the current news story and switch to the next news story or the previous news story in the playlist by using simple touch screen gesture or based on a voice command. For example, swiping across the user device screen or using the voice command "next" would skip the current viewed video clip and the next video clip in the playlist would be displayed. Similarly, the user can view the previous story based on another voice command say, "previous story."

According to another embodiment of the invention, the duration (size) of each bucket is defined by using the intelligence of the system using both human evaluation and, eventually, machine learning. For example, a user who has given high preference to National News would hence have a Playlist comprising a National News "bucket" amounting to, for example, 40% of the total duration of the newscast. A user with a high preference for Business News could be shown, say, 30 seconds (out of duration of say 1 minute for entire newscast) of the Business News Bucket. The size of the buckets is further determined based on the relevancy of the content/news story. The determination of the relevancy is described in detail below.

In another embodiment of the invention, once the bucket sizes are determined, and long stories have been inserted where applicable, the system will fill the rest of the buckets with short stories on the basis of the Story Decision Valve (SDV). The platform ranks all the content available on the cloud in a decreasing order as per SDV. The SDV value can be a mathematical number that shows how important it is to display a particular story to a particular individual. Hence the SDV for a particular story will be different for two people, but isn't entirely dependent on user preferences either.

The SDV is for example, calculated based on the following parameters:
 a) Editorial Priority Index (EPI): A value entered by human editors on the relative importance of each content (video news) as it is ingested. In an exemplary embodiment, this is a number on a scale of 0-99 but not limited thereto. The EPI can be based on any other scale known in the art. It is determined by the platform from the metatags of each news content.
 b) Time Elapsed Index (TEI): A value that describes how much time has passed since the content (story) was ingested. The importance of a story to SDV decreases with time elapsed, and hence TEI is inversely proportional to the time which has passed. That is, TEI~1/t, or TEI~{1−t} where t is the time elapsed since the time stamp. This is determined automatically by the platform.
 c) Local Priority Index [LPI]: Between two news stories or the news content ranked same on the EPI, the platform would give a higher SDV to a story based on particular region/city in case the viewer is from that particular location. For example, if the news story is ranked 8 on EPI, the platform would give higher SDV to the story based in Mumbai in case the viewer is from Mumbai.
 d) Machine Recommendation Factor [λ]: This is a value derived from machine learning based on factors including clickstream analysis of user behavior, analysis of community video viewing patterns, trends on Twitter and social media, analysis of Google searches etc. The clickstream analysis is the determination of the clicks on news stories and using the same to determine the relevancy of the news story.
 e) Already Viewed Factor [AVF]: The platform will also determine if a person has already seen the video, and if so, how many times. As with the TEI, this is also an inverse function to time.

The parameters described herein are not limited in any way. The other parameters which can be included for the calculation of SDV are within the scope of the invention.

In an exemplary embodiment, once the parameters have been determined, the platform computes the SDV as per the following equation:

$$SDV=f\{w1*EPI+w2*TEI+w3*LPI+w4*\lambda+w5*AVF+ \ldots \}$$

Each of the bucket is filled based on the SDV value and on the basis of user viewing time. As mentioned, the platform first checks if the bucket size is more than a predetermined time (say 3 minutes), then a Long package (say for 90 sec duration) can be inserted in the relevant bucket. Rest of the buckets are filled based on a decreasing ranked order of calculated SDV values. The content present in the buckets is provided to the user as a linear newscast for viewing.

According to another embodiment of the invention, the platform creates a customized playlist of news video clips that are on the basis, but not limited to, of user preferences as well as subject to human editor decision making, and absolute systemic factors such as geography and time elapsed. It is a distinguishing feature of the invention that user preference is only one of the parameters considered, and a range of other parameters are considered as well, including indications from human editors on editorial priority, and machine learnt inputs such as which news stories are being consumed elsewhere. This has the effect of ensuring that viewers don't get locked into what are described as "ideological echo chambers" where only a narrow subset of information is shared with them.

This customized playlist can be played by a single tap of a button. This is in contrast to the present video news players that require tapping on individual video clips to view them. The platform enables seamless playing of the video content one after another in a linear stream that will replicate the ease of use of watching a newscast on television, but will provide customized content. The playlist comprises a number of different categories including, but not limited to, national, international, local, business, sports, entertainment and tech news. This enables the provision of complete information to a user, as opposed to narrow playlists that only repeat variants of a single story or theme.

The content/video clips, in a way are stitched together by buffering a story while the previous one is playing. This ensures no gap between one story and another. Each of the buckets comprising news stories, are played one after another seamlessly.

The platform can also insert specially recorded TV anchor links to mirror the experience of watching TV news. It can, in addition, play for the viewer opinion pieces contributed by leading news personalities. Users can have the ability to determine the split between news stories and opinion, and also choose the journalists whose opinion they would like to see. Further, the platform can also suggest opinion makers who have differing points of view, to break the ideological echo chamber trap.

In another embodiment of the invention, the user will have the ability to edit the playlist provided by the platform or create a new playlist. The editing of the playlist can be in the form of changing the order in which news clips are being displayed, deleting clips altogether or adding new stories. Thus, the users have the capability to rearrange the playlist provided by the platform. The users have an option to create an entirely new playlist by using the existing content from the platform. In another embodiment of the invention, users have an option to remove the anchor links. In yet another embodiment of the invention, while editing the playlist the user can add his own opinions as anchor links interspersed between the news clips.

In an embodiment of the invention, a user can build a newscast entirely of his/her own by creating a new playlist or editing the existing playlist. The user can then share this newscast with friends and the world in general using social media and other forms of communication. When any of those people click on what this user has forwarded, they will be able to see a seamless newscast as edited by that user.

The platform hence enables the users to become editors of their own newscasts. The platform is particularly attractive in that all the newscasts are built from the authentic and verified news clips that were uploaded to the system. As a result, the proliferation of fake news is prevented. This is one of the useful features of the invention.

In an embodiment, the user also has the ability to record and upload his or her own video comments and add this to the edited playlist. The user has an option to record his/her opinions along with the video content in the newscast/playlist and upload the edited playlist on the platform. Thus, the user can share his content with other users via platform. In another embodiment of the invention, the user can create his own playlist using the video clips of the existing playlist available with the user and/or the user can add his own created video clips/opinions to the playlist. The edited playlist and/or the new playlist can be uploaded on the platform for sharing with other users/subscribers of the platform. In one embodiment of the invention, user can create his/her own playlist and upload the same on the platform.

According to another embodiment of the invention, the different aspects of the invention outlined herein happen dynamically in real time, and on demand. At the same time, users also have the ability to download personalized newscasts to their devices at a time of their choosing. If the user requests for a download of the newscast at 7 am, for example, then the platform will create the personalized playlist before downloading it to the user's handheld device. This enables the user to view the newscast on demand even when the user is offline, or doesn't want to use mobile data at a particular point of time.

In yet another embodiment of the the invention, the newscast can be switched to different content formats based on the availability of network bandwidth to the user. This ensures continuity of the newscast without being affected by the bandwidth. For example, a user can be asked to switch to audio or textual mode of the newscast if the network bandwidth is not sufficient to view the video format of the newscast. The change to other formats i.e from textual to video and vice versa are within the scope of the invention.

FIG. 1 describes a general architecture of the entire system 100 for the present invention. A user 102 operates one or more user terminals 101. The one or more user terminals 101 are at least connected to a network including a server or a cloud 103. The communication medium between the one or more user terminals and the server/cloud can be internet or any other communication medium known in the art. The server/cloud 103 stores the user information along with the videos published by the content creators or content editors. The server 103 is in communication with the one or more user terminals 103. The communication is done using communication network 104.

Each of the one or more user terminals 101 may be any suitable device with at least a display, a storage unit and network connectivity. In an embodiment of the present invention, each of the user terminals is a portable communication device. Examples of the portable communication device include a laptop, a smart phone, a tablet, a smart speaker and the like. As an example, the smartphone may be an Apple® smartphone, an Android smartphone, a Windows® smartphone and/or the like. An example of the smart speaker can be Echo® smart speakers and/or the like. In another embodiment of the present invention, each of the one or more user terminals is a fixed communication device. Examples of the fixed communication device include a desktop, a workstation PC, smart television and the like. Each of the one or more user terminals 101 runs on an operating system. In general, the operating system provides an interface for the user 102 to interact with hardware of each of the user terminals and other connected devices. In an example, the operating system installed in the one or more user terminals 101 is a Windows® based operating system. In another example, the operating system installed in the one or more user terminals 101 is a Mac® based operating system. In yet another embodiment of the present disclosure, the operating system installed in the user terminals is a Linux® based operating system. In yet another example, the operating system installed in the user terminals is a mobile operating system. Examples of the mobile operating system include but may not be limited to Android operating system, Apple iOS, Symbian based operating system, BADA operating system and Blackberry operating system.

The one or more user terminals 101 are connected to the server/cloud (hereinafter platform) 103 through the communication network 104. Each user terminal of the one or more user terminals 101 is registered with the platform 103. In general, the communication network 104 is a part of a network layer for connecting the communication devices. Further, the communication network 104 may be any type of network. In an embodiment of the present disclosure, the type of communication network 104 is a wireless mobile network. In another embodiment of the present disclosure, the type of communication network 104 is a wired network with a finite bandwidth. In yet another embodiment of the present disclosure, the type of communication network 104 is a combination of the wireless and the wired network for the optimum throughput of data transmission. In yet another embodiment of the present invention, the type of communication network 104 is an optical fiber high bandwidth network that enables a high data rate with negligible connection drops. In another embodiment, the communication network is able to communicate between the communication devices and is not limited to the examples above.

The one or more user terminals 101 access data over the communication network 104 by utilizing one or more applications. The one or more applications include but may not be limited to a web browser, a mobile application, a widget and web applets. In general, each of the one or more applications have a user interface such as a graphical user interface that is designed to display and fetch data from the platform 103. In addition, each of the one or more applications on any of the one or more user terminals 101 are associated with the user to provide an interface for real time streaming, uploading and downloading of video files and audio files. The web browser installed in the one or more user terminals 101 may be any web browser. Example of the web browsers includes Google Chrome, Mozilla Firefox, Opera, UC Web, Safari, Internet Explorer and the like. Examples of the mobile platform include but may not be limited to Android, iOS Mobile, Blackberry and Bada.

Figure 2:
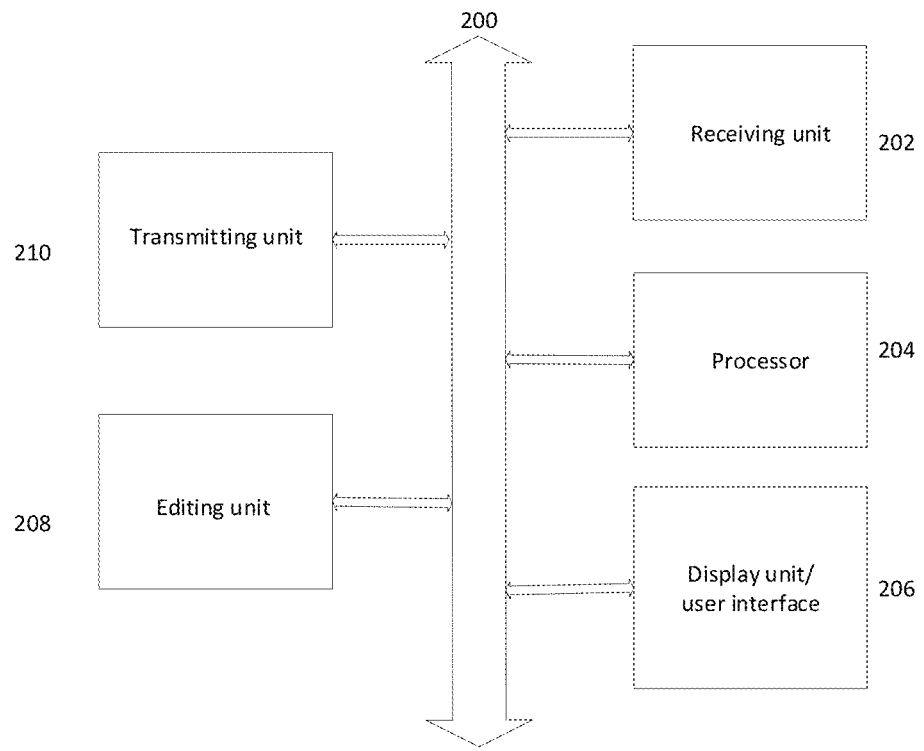
FIG. 2 is an exemplary network include user terminal working along with the server/cloud according to an exemplary embodiment of the invention.

FIG. 2 describes essential components of a user terminal for the present invention. The user terminal 200 comprises a receiving unit 202 for receiving the content from the platform 103. In one embodiment, the content from other servers can also be received through the receiving unit 202. The received content which can be in the form of video clips is processed using a processor 204. It is to be noted that the processor can be a dedicated processor configured to process the content received from the server in a format which can be consumed by the user. In other words, the processor can be a specific processor on the user terminal to process the customized content to the user. The received content processed by the processor 204 is displayed on the display unit 206 via a user interface or a Graphical user interface. In one embodiment of the invention, the content displayed on the display unit/screen can be in the form of a playlist or a video playlist which can be edited by the user. In another embodiment of the invention, the customized content can be displayed in textual form on the display screen of the user terminal. In yet another embodiment of the invention, the customized content can be in the form of an audio content received by the user terminal. An editing unit 208 is used to edit the playlist by the user in the desired way as disclosed in this disclosure in different embodiments. Further, the editing unit 208 can be used to upload the edited data/video data on the platform via the transmitting unit 210. The transmitting unit 210 is also used to transmit the user request to the platform and subsequently receive the desired content from the platform.

The user preferences include inputting of a predefined time to watch the customized content, a genre of the different type of content or the like but not limited to. That is, the genre include categories of the content such as International news, Local news, National news, sports, business, entertainment, trending news stories, top stories. Preferably, the genres of the content are input via the graphical user interface using graphical sliders, bars, numeric values, touch gestures and other graphical tools known in the art. In one embodiment of the invention, the graphical sliders/bars/touch gestures etc. as input tools of the graphical user interface may be used to select different categories of the content. In another embodiment of the invention, each of the input tools may be used to select type of content based on genre. However, the other variations are within the scope of the invention and not limited in any way. The platform may include inputting a physical location of the user. Alternatively, the physical location of the user can be accessed via global positioning system (hereinafter "GPS") and made available to the platform automatically. In yet another embodiment, the physical location is derived from internet service provider's server's location. In another embodiment, the user has an option to fix the time to download the customized content from the platform.

In one embodiment of the invention, the user terminal may be a smart speaker, where the content received by the receiving unit 202 can be in the form of audio clips processed using a processor 204. The received content is processed by the processor 204 and an output unit (not shown) is configured to play the customized content from the platform. In one embodiment of the invention, the content played by the output unit can be in the form of a playlist. In another embodiment of the invention, the user can play the desired content from the playlist using specific commands (for example, voice command) In another embodiment of the invention, the customized content can be in the form of textual content only. The textual content can be displayed by the display unit 206. It is to be noted that the invention can be performed by the different embodiments of the invention at same time. It is also possible that the playlist is consumed by the user in different formats (video, audio, text etc.) simultaneously.

The server or the platform provides an interface to one or more content providers or content editors. The platform may correspond to any one of the website, mobile application, web application, mobile browser based platform. In an embodiment of the present disclosure, the platform is a subscription based paid platform available to the user via the user interface discussed herein. In another embodiment of the present invention, the platform is a paid platform. In yet another embodiment of the present invention, the platform is free access, single registration and login based platform. The platform provides content on demand service. Further, the platform may include a media player, a list of thumbnails, input buttons, media content, user setting options, recommendation panel, account panel, search panel, user preferences panel. The features described herein are not limited therein. The features may be available alone or in combination and would not deviate from the scope of the invention.

Figure 3:
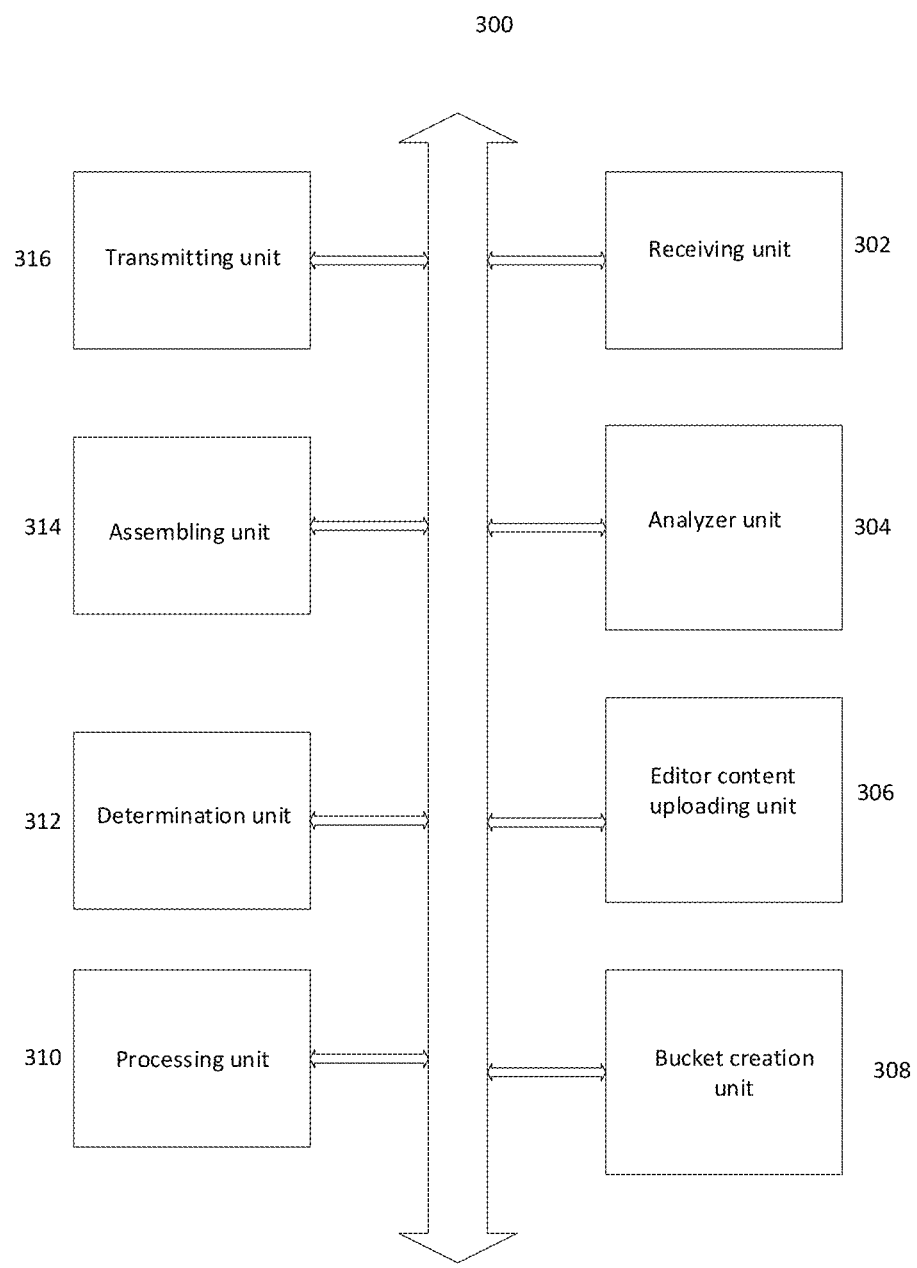
FIG. 3 is an exemplary network include user terminal working along with the server/cloud according to an exemplary embodiment of the invention.

FIG. 3 discloses the components of the platform/server/cloud 300 in accordance with the embodiments of the invention. In one embodiment of the invention, the platform, cloud, one or more servers are parts of a network. The user preferences including genres, duration of the video content from the one or more user terminals are received by a receiving unit 302. The input data from the one or more user terminals is analyzed by an analyzer unit 304. The user input in form of user preferences and input time etc. is received by the receiving unit 302 of the platform 300. Content on the platform is available in the form of video clips and is uploaded by content publishers/editors. In one embodiment of the invention, the content in the form of video clips can be edited and uploaded by the publisher/editor using a user interface. In one embodiment, the content can be uploaded by the publisher via an administration login or person login specific to the publishers/editors or the like. The editor content uploading unit 306 provides an interface to upload the video content on the platform 300. As discussed herein, the user preferences input by the user are used by a bucket creation unit 308. In other words, the bucket creation unit 308 uses the user input including user preferences, time value etc. to determine the buckets to be filled with the content for a specified user providing the user input. The content to be filled in the one or more buckets is determined using a determination unit 312. All the content processing analysis of the content/data on the platform is performed by a processing unit 310. In one embodiment, the processing unit 310 is configured to execute various operations associated with the platform. In another embodiment, various components of the platform are associated with each other and operate in conjunction with each other using the processing unit 310. Further, the video clips or the content to be filled in the buckets are determined by the determination unit 312. In one embodiment of the invention, the determination unit 312 determines the content associated with each of the buckets created by the bucket creation unit 308. In one embodiment of the invention, each of the buckets represent a category/classification of the content for the specific user. The content determined by the determination unit 312 is filled in respective buckets and sent to an assembling unit 314 for assembling the determined content filled in each of the bucket. The assembling unit 314 is further configured to intersperse the anchor links or another content between the video content in each of the bucket. In one embodiment of the invention, the interspersed content in between the content of each bucket can be anchor links, advertisements, or any other content deemed suitable by the platform. In another embodiment, the interspersed content can be specific to user or it can be a general content to be shown to the user. The assembled content along with the interspersed content is transmitted to the user for display of the one or more user terminals by a transmitting unit 316. In one embodiment of the invention, the content transmitted to the one or more user terminals can be in the form of playlist which is known to a person skilled in the art.

In one embodiment of the invention, the platform includes one or more servers executing specific tasks such as storing the content, filling the buckets with the content for each user and storing the same therein, determining the relevancy of the content and the like described in the specification and executed by the platform. The platform is capable of executing the tasks described herein from a single server which is within the scope of the invention.

Figure 4:
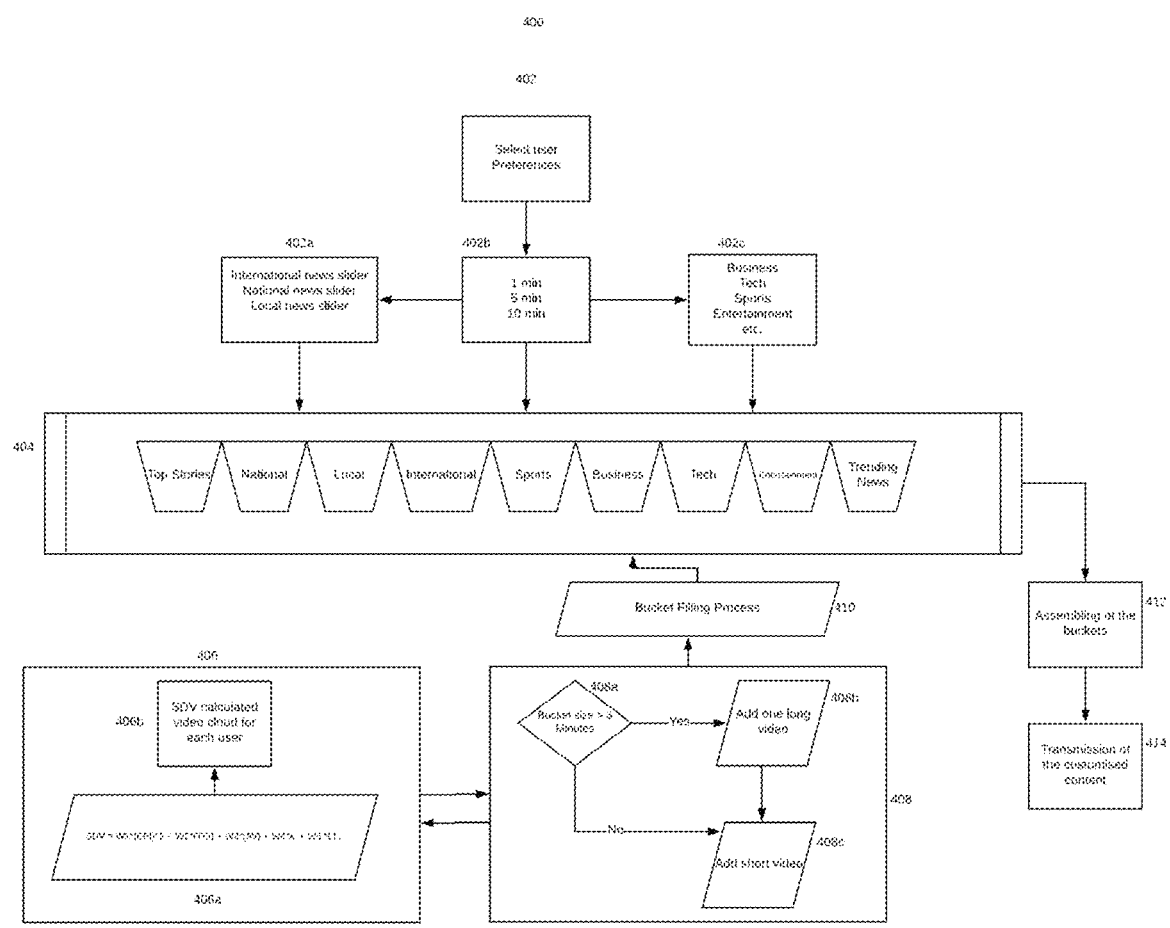
FIG. 4 is an exemplary network include user terminal working along with the server/cloud according to an exemplary embodiment of the invention.

FIG. 4, describes a flowchart outlining the features of the invention in an embodiment of the invention. User preferences are selected by the user by using a graphic slider/touch gestures and other graphical input tools and displayed on the screen of the user terminal or by utilizing any other selection options known in the art as discussed above. The user preferences are selected on the basis of geography, character, popularity etc. of a news item. The platform creates a plurality of buckets pertaining to the user preferences, editorial preferences and other pre-set parameters. The user also inputs the viewing time for which video content/newscast for example, needs to be provided by the platform.

The flowchart 400 discloses a method used by the platform 300 to retrieve the content in the form of playlist or newscast. A user using a user terminal selects preferences 402 using a user interface of the user terminal. The user preferences 402 include various categories or classes of the content preferred by the user. For example, the categories (402a, 402c) of the video content may be International news, Local news, National news, sports, business, entertainment, trending news stories, top stories according to one embodiment of the invention. The user preferences also include the duration 402b for which the user would like to watch the video newscast. The user preferences 402 are collected and based on the user preferences, the platform creates a number of buckets 404 for filling the content. The number of buckets preferably correspond to each of the category selected by the user in the user preferences. The content to be filled in each of the bucket created is based on the user preferences and other factors discussed above. The method 406 calculates Story Decision value (SDV) of each video content for user 406b providing the user preferences. The calculation of the SDV 406a is disclosed herein above. The method further determines size in terms of duration for each bucket. If the bucket size is greater than a predetermined time 408a (say 3 minutes), the method 410 fills the bucket with a long story 408b or video (say 90 seconds). The remaining duration in the bucket is filled with short videos 408c based on the SDV value determined by the method. On the other hand, if the size of bucket in terms of duration is less than predetermined time (say 2 minutes), the bucket is filled based on the SDV value and long story is not inserted in the bucket. Accordingly, each of the bucket created by the method is filled.

It is to be noted that the filling of the buckets with more than one long story in a bucket is within the scope of the invention. Similarly, filling of the buckets with short stories without the addition of long stories is also within the scope of the invention. In one embodiment, the duration in the user preferences can be selected by the user as discussed above.

Alternatively, the duration to watch the video can be chosen by the platform automatically. The platform can also choose the duration based on user behavior or activities while interacting with the platform.

After the buckets are filled, the content of each of the buckets is assembled 412 and the another predetermined content can interspersed between each of the buckets. As discussed above, the interspersed content can be anchor links pertaining to an anchor illustrating the content/newscast in the subsequent bucket. Further, the buckets with Top stories can be added as fixed content in every newscast. It means that the fixed newscast is necessarily shown to the user irrespective of the user preferences. The assembled content can be in the form of video playlist and is transmitted to the user 414.

The invention is a significant development in using advanced machine learning together with human understanding of news values to solve some of the most critical issues facing the broadcast industry today. The invention discloses a new method and system for creating customized newscasts that results from combining the best of television (linear viewing and ease of use) and present digital systems (i.e. choice and user preferences), and then adding personalization and the ability to edit your own newscasts and share them.

The invention as described above has the advantages discussed herein. Further, advantages of the present invention over the existing art is that relying only on user preferences would lead to echo chambers and such systems only give people what they want, instead of broad based news that leaves them well informed. The present invention allows a proper newscast to be prepared. Also, the system of the present invention allows a newscast to be prepared that provides an ordered list of news stories. For example, the ordered newscast is in the form starting with national news, then international, followed by business, technology, sports, showbiz and lifestyle and not limited thereto. Further, the present invention gives the users ability to edit playlists and create their own fresh playlists. Moreover, the users have the ability to record their own video opinions and add those to playlists.

The invention is described above in terms of a news platform with content in the form of newscast but is not intended to be limited thereto. The same principles can be used to develop intelligent playlists in other areas where video clips can be joined together to form customized playlists. All and any video content on a digital platform using the disclosure of the invention are within the scope of the invention.

The invention described above discloses developing a video content playlist for a user which is not intended to be limited thereto. The principles of the invention are applicable to other formats of the content such as audio content and the textual content, for example. In one embodiment of the invention, the user can input a command (touch, voice etc.) on the user terminal and the platform can create the playlist in accordance with different embodiments discussed above. The playlist thus created, can be a video playlist with audio and textual content included therein. In another embodiment, the playlist thus created, can only be audio playlist which can be heard by the user. In yet another embodiment of the invention, the playlist thus created, can be in the form of textual content displayed on the display screen of the user terminal.

In yet another embodiment of the invention, on receiving a command for example, a voice command, specific content (audio, video, textual etc.) is provided on the user terminal.

As an example, the user can use the command "play the entertainment news for me". Thus, in accordance with different embodiments of the invention, the platform would retrieve the entertainment bucket from the user's playlist to be played on the user terminal. It is to be noted that the user terminal can also play only audio content for the user.

The platform described herein is composed of multiple hardware elements to enable the invention. As discussed above, the platform includes a cloud for storing the video clips related to different buckets. The cloud can be associated with one or more servers, where the storage, analysis and synthesis of the playlist or logical sequencing of the newscast is done. Moreover, the server can include a number of hardware component in the form of various units on the platform as discussed above. The content dissemination is from a single content delivery network (CDN) client. The platform includes various hardware components such as memories, central processing unit (CPU), digital controllers and microprocessors, interfaces and other components. In various embodiments, there can be different digital controllers for performing different aspects of the invention. The digital controllers can work in co-ordination and provide the output to the CPU via different interfaces. Similarly, according to different aspects of the invention, the output results can be provided to the intended users via multiple interfaces. For example, the platform can communicate with the user devices through wired or wireless means by various interfaces known in the art.

In one embodiment of the invention, the invention can be operated using the one or more computer readable devices. The one or more computer readable devices can be associated with the cloud. The computer readable medium is configured to create a number of buckets on the one or more servers or cloud. The number of buckets include the video content to be consumed by the user. The one or more computer readable mediums determines the content to be filled in each of the buckets. The one or more computer readable mediums is further configured to fill the determined content in each of the bucket by a real time criteria which is based on the user preferences and assemble the buckets with filled content and interspersing a predetermined content between each of the buckets to form the customized content. The customized content is transmitted to the user terminal for user consumption.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

I claim:

1. A method of providing customized video content from a platform to a user, the method comprising:
receiving from a user terminal user preferences for creating customized video content, wherein the user preferences comprise at least a time duration for consumption of the customized video content;
creating a plurality of buckets for the video content to be consumed by the user based on the user preferences, each bucket being created based on the user preferences and for duration of video content to be filled in each bucket;
determining the video content to be filled in each of the buckets;
filling the determined video content in each of the buckets by a real-time criteria which is based at least on the user preferences, wherein each bucket is filled with video content of a first duration and with video content of second duration depending on the size of the bucket;
assembling the filled buckets to form a customized video content limited to said time duration; and
transmitting said customized video content to the user terminal for user consumption.

2. The method as claimed in claim 1, wherein the assembling of the buckets further comprises interspersing a predetermined video content between buckets to form customized video content.

3. The method as claimed in claim 1, wherein the user preferences include genre for the video content, wherein the genre includes video content belonging to one or more of international, national, local, location based, sports, technology, business and entertainment.

4. The method as claimed in claim 1, wherein each of the bucket designates a storage space corresponding to the user preferences and size of each bucket corresponds to the duration of each bucket.

5. The method as claimed in claim 1, wherein the video content in each bucket is filled with at least a long package if the time duration of the bucket exceeds a predetermined time.

6. The method as claimed in claim 5, wherein the remaining duration of the bucket after the filling of the long package is determined based on the real time criteria.

7. The method as claimed in claim 1, wherein the real time criteria to fill the video content in each bucket is based on a Story Decision Value (SDV).

8. The method as claimed in claim 7, wherein the calculation of the SDV is based at least on Editorial Priority Index, Time Elapsed Index, Video Content already viewed, Local index parameters.

9. The method as claimed in claim 1, wherein the user preferences are input using a graphic slider and/or bar and/or numeric digits and/or using tapping gestures on the user terminal.

10. The method as claimed in claim 1, wherein the customized video content for user consumption is in the form of a playlist limited to said time duration, and wherein the playlist can be edited and the video content can be re-arranged and deleted by the user, wherein the user can upload the edited playlist on the platform, wherein the edited playlist on the platform can act as video content for other users, wherein the edited playlist includes clips having opinion recorded by the user.

11. The method as claimed in claim 1, wherein the customized video content for user consumption is in the form of a playlist limited to said time duration, and wherein the user can create a new playlist on the platform, wherein the user can upload the new playlist on the platform, and wherein the new playlist on the platform can act as video content for other users, wherein the new playlist includes clips having opinion recorded by the user.

12. The method as claimed in claim 1, wherein the video content includes a content which is shown irrespective of the user preferences.

13. The method as claimed in claim 12, wherein the wherein the method reduces proliferation of fake content in the customized video content.

14. The method according to claim 1 wherein the video content of first duration in at least one bucket is a long video.

15. The method according to claim 1 wherein the user preferences include a duration for at least one bucket.

16. The method according to claim 1 wherein at least one bucket comprises "Top Stories" curated by human editors without being dependent on user preferences.

17. A user terminal for receiving customized video content from a network, the user terminal comprising:
a user interface to receive user preferences from a user comprising at least a time duration to watch the customized video content;
a transmitter to transmit the user preferences to the network;
a receiver to receive the customized video content from the network; and
wherein the network is configured to:
(i) receive from the user terminal user the user preferences;
(ii) create a plurality of buckets for the video content to be consumed by the user at least based on the user preferences, each bucket being created based on the duration of video content to be filled in each bucket;
(iii) determine the video content to be filled in each of the buckets;
(iv) fill the determined video content in the buckets by a real time criteria based on the user preferences, wherein each bucket is filled with video content of a first duration and with video content of second duration depending on the size of the bucket; and
(v) assemble the buckets with filled video content to form the customized video content limited to said time duration; and
wherein the user terminal further comprises a display unit to display the customized video content on the user interface.

18. The user terminal as claimed in claim 17, wherein the network is configured to fill at least one bucket based on a user genre preference, and the assembling of the buckets further comprises interspersing a predetermined video content between buckets to form customized video content.

19. The user terminal as claimed in claim 17, wherein the user preferences are input using a graphic slider and/or bar and/or numeric digits and/or using tapping gestures.

20. The user terminal as claimed in claim 17, wherein the customized video content for user consumption is in the form of a playlist limited to said time duration.

21. The user terminal as claimed in claim 20, wherein the playlist can be edited and a new video content therein can be added by the user, wherein the user can upload the edited playlist on the network, wherein the edited playlist on the network can act as video content for other users, wherein the edited playlist includes clips having opinion recorded by the user.

22. The user terminal as claimed in claim 20, wherein the user can create a new playlist, wherein the user can upload the new playlist on the network, and wherein the new playlist on the network can act as video content for other users, wherein the new playlist includes clips having opinion recorded by the user.

23. The user terminal as claimed in claim 20, wherein the playlist can be edited and the video content therein can be re-arranged and deleted by the user.

24. The user terminal as claimed in claim 20, wherein the user can use touch gestures on the display or a voice command to skip the current viewed video content in the playlist and watch the next content in the playlist.

25. The user terminal as claimed in claim 20, wherein the display unit is configured to display the customized content as textual content from the playlist.

26. The user terminal as claimed in claim 17, wherein a user input is received as a single tap of a button, wherein the user input is a voice based command to retrieve the customized video content from the network.

27. The user terminal as claimed in claim 26, wherein the customized video content is received from the network on the single tap of a button or the voice command from the user.

28. A system to provide customized video content for consumption by a user using a user terminal, the system comprising:
  a receiver to receive user preferences from a user terminal, wherein the user preferences comprise at least a time duration for consumption by the user of customized video content;
  means for analyzing the user preferences to determine the video content to be retrieved from the system;
  a processor configured to create a plurality of buckets for the video content to be consumed by the user based at least on the user preferences, each bucket being created based on the duration of video content to be filled in each bucket;
  a processor configured to determine the video content to be filled in each of the buckets, wherein each bucket is filled with video content of a first duration and with video content of second duration depending on the size of the bucket;
  a processor configured to assemble the buckets with filled video content to form customized video content limited to said time duration;
  a transmitter to transmit the customized video content to the user terminal for user consumption.

29. The system as claimed in claim 28, wherein the system reduces proliferation of fake content in the customized video content.

30. The system as claimed in claim 28, wherein the assembling of the buckets further comprises interspersing a predetermined video content between buckets to form customized video content.

31. A computer readable medium comprising one or more processors and a memory coupled to the one or more processors, the memory for storing instructions which on execution by the one or more processors, the one or more processors configured to:
  receive user preferences from a user terminal, wherein the user preferences comprises at least a time duration for consumption by a user of customized video content;
  create a plurality of buckets for the video content to be consumed by the user at least based on the user preferences;
  determine the video content to be filled in each of the buckets;
  fill the determined video content in each of the buckets by a real time criteria which is at least based on the user preferences, wherein each bucket is filled with video content of a first duration and with video content of second duration depending on the size of the bucket;
  assemble the buckets with filled video content to form customized video content limited to said time duration; and
  transmit the customized video content to the user terminal for user consumption.

32. The computer readable medium as claimed in claim 31, wherein the assembling of the buckets further comprises interspersing a predetermined video content between buckets to form customized video content.

33. A user terminal for receiving customized content from the network, the user terminal comprising:
  a user interface to receive user preferences from a user comprising at least a time duration for consumption by a user of customized content;
  a transmitter to the transmit the user preferences to the network;
  a receiver to receive the customized content from the network; and
  wherein the network is configured to:
    create a plurality of buckets for the content to be consumed by the user based at least on the user preferences;
    determine the content to be filled in each of the buckets;
    fill the determined content in the buckets by a real-time criteria based at least on the user preferences, wherein each bucket is filled with video content of a first duration and with video content of second duration depending on the size of the bucket; and
    assemble the buckets with filled content to form customized content; and
  means for providing the customized content limited to said time duration for the user.

34. The user terminal as claimed in claim 33, wherein the customized content received from the network is an audio content, wherein the audio content is in the form of playlist.

35. The user terminal as claimed in claim 33, wherein the customized content received from the network is a textual content and the user terminal comprises a display configured to display the textual content.

* * * * *